United States Patent [19]

Takahashi

[11] Patent Number: 4,518,253

[45] Date of Patent: May 21, 1985

[54] DISTANCE MEASUREMENT SYSTEM

[75] Inventor: Akira Takahashi, Kanagawa, Japan

[73] Assignee: Ricoh Company, Ltd., Tokyo, Japan

[21] Appl. No.: 244,736

[22] Filed: Mar. 17, 1981

[30] Foreign Application Priority Data

Mar. 19, 1980 [JP] Japan ............................... 55-035328

[51] Int. Cl.³ .............................................. G01C 3/08
[52] U.S. Cl. ..................................... 356/4; 250/214 B;
354/403; 367/99; 367/108; 367/111
[58] Field of Search ................ 250/214 B; 354/25 A,
354/403; 356/1, 4; 367/99, 108, 111

[56] References Cited

U.S. PATENT DOCUMENTS

| 3,572,928 | 3/1971 | Decker, Jr. et al. | 356/4 |
| 3,937,574 | 2/1976 | Peckham et al. | 356/4 |
| 4,274,735 | 6/1981 | Tamura et al. | 356/1 |
| 4,295,740 | 10/1981 | Sturges, Jr. | 356/4 |

Primary Examiner—S. C. Buczinski
Attorney, Agent, or Firm—Guy W. Shoup; Gerard F. Dunne

[57] ABSTRACT

A distance measurement system for measuring distance to an object by emitting light to the object and measuring the intensity of light reflected from the object.

5 Claims, 5 Drawing Figures

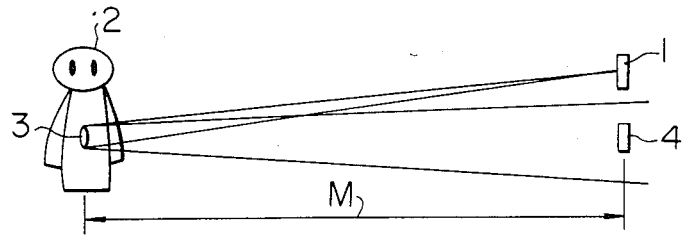
FIG. 1
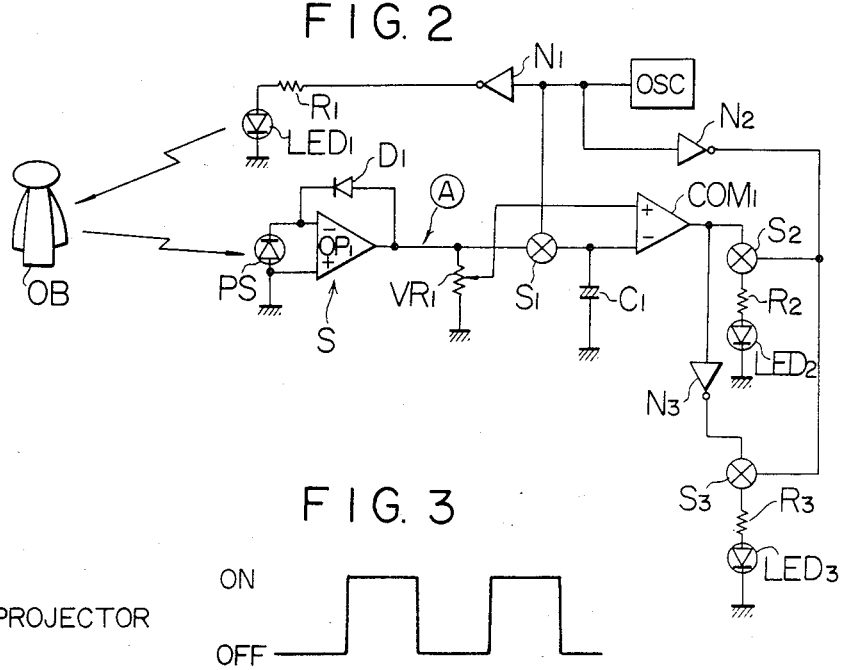
FIG. 2
FIG. 3

DISTANCE MEASUREMENT SYSTEM

BACKGROUND OF THE INVENTION

The present invention relates to a distance measurement system for use with cameras or other optical devices.

As conventional distance measurement systems which determine the distance from an object to a camera or the like by detecting light reflected from the object by using photoelectric elements, a space frequency detection system (contrast detection system), a double image overlapping system (trigonometrical measurement system) and a time-lag measurement system are known. In the systems of the space frequency detection type, those that detect an extreme value of space frequency are in general use. In this type of space frequency detection system, a dip effect of a photoelectric element, that is, the phenomenon that the electrical resistance of the photoelectric element exhibits an the extreme value when the image of the object is in focus, is utilized. In the double image overlapping system, the image of the object is detected by a pair of photoelectric elements and the distance to the object is measured by changing the viewing angle of one photoelectric element while performing mirror-scanning to detect the point at which the two images completely overlap. This system is disclosed in Japanese Patent Publication No. 46-028,500 and U.S. Pat. No. 3,274,914. Honeywell type distance measurement system belongs to that type. A representative example of the time-lag measurement system, which measures the distance between the object and a predetermined point by measuring the time required for ultrasonic sound to travel from that point to the object and to return from the object to the point, is disclosed in Japanese patent publication No. 47-048,408.

The photoelectric elements for space frequency detection system are expensive, and that system involves a complicated signal processing procedure. The double image overlapping system requires some mechanical elements for mirror-scanning and has a limitation to the space obtained for the ground line. Moreover, the time-lag measurement system requires a ultrasonic sound generator which is rather large in size and expensive.

SUMMARY OF THE INVENTION

It is therefore an object of the invention to provide a distance measurement system for measuring the distance from the object to a predetermined point by measuring the intensity of light reflected from the object. Such a distance measurement system is simple in mechanism, does not require any mechanical operation, and is advantageous with respect to the space required and cost.

Another object of the invention is to provide a distance measurement system capable of distinguishing the light reflected from the object and external light, and measuring the distance from the object to a predetermined point, regardless of the intensity of external light.

BRIEF DESCRIPTION OF THE DRAWINGS

FIG. 1 is a diagram for explaining the principles of the invention.

FIG. 2 is a circuit diagram for use in one embodiment of a distance measurement system according to the invention.

FIG. 3 is an operational timing chart for the circui diagram in FIG. 2.

DETAILED DESCRIPTION OF THE EMBODIMENTS

Figure 4:
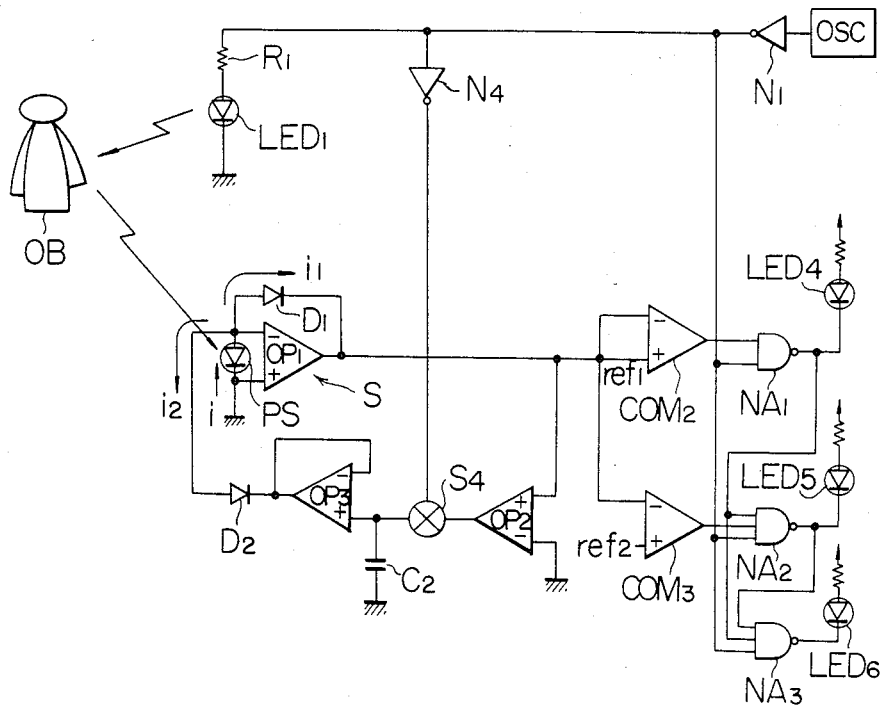
FIG. 4 is a circuit diagram for use in another embodi ment of the invention.

Referring to FIG. 1, light from a first light source reaches an object 2, and the light is reflected from th object 2. Thus, the object 2 becomes may be considered a second light source 3. The quantity B of light from th second light source 3 to a light receiving element 4 i inversely proportional to the square of the distance M between the first light source 1 (and light receivin; element 4) and the object 2. Therefore, when the reflec tion ratio of the object 2 is $\alpha$ and the quantity of ligh projected from the first light source 1 is A, the follow ing relationship holds:

$$B \propto \alpha A 1/M^2$$

Therefore, distance measurement can be performed o the basis that the intensity of the light reflected from th object 2 is reduced at rate inversely proportional to th square of the distance M. In this case, the reflectio ratio $\alpha$ may vary depending upon each object. How ever, when high accuracy is not required for the dis tance measurement, the above-mentioned principle ca be utilized in a simple auto-focusing device for a camer with two or three focusing zones.

FIG. 2 shows an embodiment of a distance measure ment system based on the above-mentioned principl according to the invention. FIG. 3 is a timing chart c the operation of the embodiment.

A pulse generated from an oscillator OSC is inverte by an inverter N1 and is then applied, via a resistor R1 to a projector LED1 comprising a light emitting diod or the like. The projector LED1 is disposed in an appr priate portion of the camera, together with a light r ceiving element PS, and intermittently emits light c other suitable radiation with a predetermined intensit to an object OB. The light receiving element PS constructed of photodiodes or the like, and light r flected from the object OB enters the light receivin element PS. The light receiving element PS, a diode D and an operational amplifier OP1 constitute a light r ceiving portion S. The output from the light receivin element PS is subjected to logarithmic compression b the diode D1 and is output from the light receivin portion S. When the projector LED1 is off and does n emit light, the output of the light receiving portion S the output obtained by detecting external or bacl ground light, that is, the light excluding the light fro the projector LED1 which enters the light receivin portion S after being reflected from the object OB. Th output from the light receiving portion S is stored in capacitor C1 through an analog switch S1 in acco dance with the output from the oscillator OSC. Analo switches S2 and S3 are off when the output of the osci lator OSC is applied thereto through an inverter N. When the projector LED1 projects light, the analo switch S1 is off, while the analog switchs S2 and S3 a on, so that the output from the light receiving portion is subjected to voltage division by a variable resistc VR1 and the divided voltage is compared, by a compa ator COM1, with the voltage stored in the capacitor C when the object is positioned at a long distance from the distance measurement system and light from the projector LED1 decreases greatly so that the light from the projector LED1 scarcely enters the light receiving element PS and cannot be distinguished from the external light, the output from the comparator COM1 remains zero. On the other hand, when the object is located close at hand, the output from the comparator COM1 is at a high level. The output of the comparator COM1 is applied to a display device LED2 comprising light emitting diode through the analog switch S2 and resistor R2 and, at the same time, to a display device LED3 comprising a light emitting diode through an inverter N3, the analog switch S3 and a resistor R3. Therefore, when the object is close at hand, the display device LED2 is lit. On the other hand, when the object is at a long distance, the display device LED3 is lit. In this case, a display is given to indicate whether the object is closer to the distance measurement system than a target distance or at a longer distance beyond the target distance. The target, or threshold, distance can be varied by the variable resistor VR1.

Since the above-mentioned embodiment does not require the movement of any mechanical devices such as a mirror scanning device, it is inexpensive. Moreover, continuous distance measurement can be performed by the variable resistor VR1. Further, since the output of the light receiving element PS is compressed by the diode D1, it will be difficult to distinguish the reflected light of the projector from external light when the external light is far more intensive than the light of the projector reflected from the object. For elimination of such a short-coming, a filter for abstracting the reflected light, which is disposed in the output side portion Ⓐ of the light receiving portion, is effective. For that purpose, a differential circuit disposed in an output side portion of the light receiving section, abstracting the reflected light, is also effective when a strobo flash is employed as the light projecting source. The following embodiment is also useful for detecting only such reflected light.

FIG. 4 shows that embodiment of the present invention. When the projector LED1 is off, the pulse generated from the oscillator OSC is applied to an analog switch S4 through inverters N1, N4, so that the analog switch S4 is on. As a result, the output of the light receiving portion S is stored in the capacitor C2 through an operational amplifier OP2 and the analog switch S4. The voltage stored in the capacitor C2 is applied to the output side of an operational amplifier OP3, so that current $i_2$ flows from the light receiving element PS to the operational amplifier OP3 through the diode D2. When the projector LED1 is on, the analog switch S4 is off, and the voltage of the capacitor C2 becomes constant. However, when light reflected from the object is detected, the current which flows through the light receiving element PS increases in proportion to the intensity of the reflected light. However, current $i_2$ is the same as that when the projector LED1 is off, because of the voltage of the capacitor C2. In other words, at that time, the current $i_2$ is that generated by the external light. The remainder current $i_1$, which is proportional to the intensity of the reflected light, flows through the diode D1, so that the reflected light can be detected independently of the external light. The output of the light receiving portion S is compared with the reference voltage ref1 of a comparator COM2 and with the reference voltage ref2 of a comparator COM3. When the object is close at hand, the output voltage of the light receiving portion S is smaller than the reference voltage ref1 and ref2, so that the output of the comparator COM2 and that of the comparator COM3 both increase to a high level, and when light is projected, the output of a NAND circuit NA1 decreases to a low level. As a result, a light emitting diode LED4 is lit. When the object is an intermediate zone, the output of the light receiving portion S is greater than the reference voltage ref1 and smaller than the reference voltage ref2, so that the output of the comparator COM2 is at a low level, while the output of the comparator COM3 is at a high level. Therefore, when light is projected, the output of the NAND circuit NA2 decreases to a low level, so that the light emitting diode LED5 is lit. When the object is at a a long distance, the output of the light receiving portion S is greater than the reference voltage ref2, so that the output of the comparator COM2 and that of the comparator COM3 both decrease to a low level, and when light is projected, the output of the NAND circuit NA3 decreases to a low level and a light emitting diode LED6 is lit.

Figure 5:
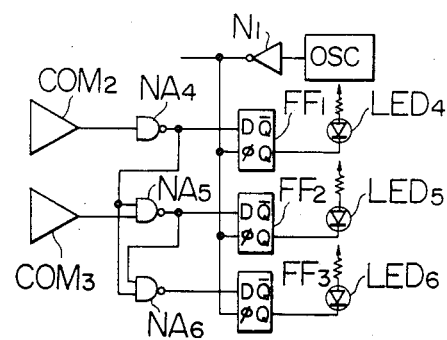
FIG. 5 is part of a circuit diagram for use in a furthe embodiment of the invention.

The light emitting diodes LED4 to LED6 are respectively connected between the NAND circuits NA1 to NA3 and a D.C. voltage source via respective resistors. The diode D1 can be a resistor or can be combined with a resistor to form a combination circuit. As shown in FIG. 5, the distance measurement signals can be output continuously by use of NAND circuits NA4 to NA6 and latch circuits FF1 to FF3, in place of the NAND circuits NA1 to NA3. In this case, the output of any of the NAND circuits NA4 to NA6 decreases to a low level, depending upon the location of the object, that is, in the near zone, in the intermediate zone or in the far zone. The output of any of the NAND circuits NA4 to NA6 is then latched by the latch circuits FF1 to FF3 in accordance with the output pulse of the inverter N1. As a result, any of the light emitting diodes LED4 to LED6 is lit.

What is claimed is:

1. A camera having a range detection system for determining whether an object to be photographed with said camera is within a predetermined distance from said camera, said camera comprising means for emitting energy towards said object, means including a single sensor receiving energy reflected from said object and developing a signal proportional to the intensity of energy received thereby, means for comparing said signal with a predetermined reference signal for producing a control signal, and means responsive to said control signal for determining whether said object is either within a predetermined range of said camera or beyond said predetermined range of said camera, said emitting means being operable intermittently, and said determining means including an element responsive to said energy land adapted to generate a level of current proportional to the intensity of energy received thereby, means operable when said emitting means is not operating for establishing the background level of current proportional to the intensity of energy received by said responsive element when said emitting means is not operating, means for draining said background level of current from said responsive element when said emitting means is operating to generate a current signal proportional to the intensity of the transmitted energy reflected by said object, and comparing means for comparing said current signal with a reference signal to activate said indicator means.

2. A camera according to claim 1, said determining means including a first display means giving a positive indication whenever said object is within said predetermined range from said camera, and a second display means giving a positive indication whenever said object is beyond said predetermined range.

3. A camera according to claim 1, said determining means including a first display means giving a positive indication when said object is within a predetermined range from said camera, a second display means giving a positive indication whenever said object is beyond said predetermined range but within a second predetermined range, and third display means giving a positive indication whenever said object is beyond said second predetermined distance.

4. A camera according to claim 1, said determining means including a first display means giving a positive indication when said object is within a predetermined range from said camera, a second display means giving a positive indication whenever said object is beyond said predetermined range but within a second predetermined range, and third display means giving a positive indication whenever said object is beyond said second predetermined range.

5. A camera according to claim 1, further including means responsive to said determining means for automatically focusing said camera.

* * * * *